(12) United States Patent
Ariyoshi et al.

(10) Patent No.: US 7,586,416 B2
(45) Date of Patent: Sep. 8, 2009

(54) REPEATERS FOR RFID SYSTEMS

(75) Inventors: Tomonori Ariyoshi, Ayabe (JP); Koyo Ozaki, Ayabe (JP)

(73) Assignee: OMRON Corporation, Kyoto (JP)

( * ) Notice: Subject to any disclaimer, the term of this patent is extended or adjusted under 35 U.S.C. 154(b) by 253 days.

(21) Appl. No.: 11/643,017

(22) Filed: Dec. 19, 2006

(65) Prior Publication Data

US 2007/0171073 A1 Jul. 26, 2007

(30) Foreign Application Priority Data

Dec. 22, 2005 (JP) .............................. 2005-370557

(51) Int. Cl.
*G08B 13/14* (2006.01)
(52) U.S. Cl. ................. 340/572.7; 340/572.8; 340/531; 340/539.1; 340/10.1; 343/731; 343/841; 343/895
(58) Field of Classification Search ............. 340/572.7, 340/572.8, 531, 539.1, 10.1; 343/731, 841, 343/895

See application file for complete search history.

(56) References Cited

U.S. PATENT DOCUMENTS 3,733,602 A * 5/1973 Cuckler et al. ................. 342/27
7,126,552 B2 * 10/2006 Locatelli et al. ............. 343/731
2006/0208899 A1 * 9/2006 Suzuki et al. ............ 340/572.7
2006/0238307 A1 * 10/2006 Bauer et al. ................. 340/10.1
2007/0001809 A1 * 1/2007 Kodukula et al. .......... 340/10.1

FOREIGN PATENT DOCUMENTS

| CN | 1339184 | 3/2002 |
|----|---------|--------|
| CN | 1704965 | 1/2005 |
| JP | 2528386 | 2/1996 |
| JP | 2004-94532 | 3/2004 |

OTHER PUBLICATIONS

CN patent application No. 2006101701199, Office Action mailed Mar. 27, 2009.

* cited by examiner

*Primary Examiner*—Tai T Nguyen
(74) *Attorney, Agent, or Firm*—Weaver Austin Villeneuve & Sampson LLP (57) ABSTRACT

In one embodiment, a repeater relays an RF signal between an RFID (radio frequency identification) transponder having a transponder antenna, and an RFID reader having a reader antenna. The repeater includes a first antenna configured to be coupled with the reader antenna; a second antenna configured to be coupled with the transponder antenna; and a first coaxial cable which is coupled to the first and second antennas.

11 Claims, 10 Drawing Sheets

REPEATERS FOR RFID SYSTEMS

This application claims priority from Japanese Patent Application JP2005-370557 filed on Dec. 22, 2005, which is hereby incorporated by reference in its entirety for all purposes.

TECHNICAL FIELD

The present disclosure relates generally to RF (radio frequency) repeaters, and more specifically to RF repeaters for RFID (radio frequency identification) systems.

BACKGROUND

In recent years, automatic identification procedures have become very popular in various fields. Some of the automatic identification procedures involve RFID systems. An RFID system typically uses RFID tags and a reader for the tags. An RFID tag (often referred to as a "transponder") typically includes (i) an antenna which is electromagnetically coupled to a reader, and (ii) an IC (integrated circuit) chip which can store information for identification purposes. The reader typically includes an RF transmitter, an RF receiver, and an antenna to "interrogate" the RFID tags, and to remotely retrieve information stored in the RFID tags.

In some situations, the user of an RFID system may need a wider coverage in space to read information stored in RFID tags from a greater distance. One way to achieve this goal is to increase an RF power output by the reader to interrogate the tags, or to increase a gain of the reader antenna.

Alternatively, the user can use a repeater located between the reader and the RFID tags so that the repeater relays RF transmission from the reader to the RFID tags, and vice versa. Examples of such repeaters are found in Japanese Laid-open Patent Publication Tokukai 2004-94532, and Japanese Registered Utility Model 2528386.

In view of the above, it would be desirable to have improved repeaters which are capable of increasing a coverage area in space to interrogate RFID tags located more distant from an RFID reader.

SUMMARY

The invention described herein provides a repeater for relaying an RF signal between an RFID (radio frequency identification) transponder having a transponder antenna, and an RFID reader having a reader antenna. The repeater includes a first antenna configured to be coupled with the reader antenna; a second antenna configured to be coupled with the transponder antenna; and a first coaxial cable which is coupled to the first and second antennas.

The invention described herein also provides a repeater for relaying an RF signal to and from an RFID (radio frequency identification) transponder having a transponder antenna which includes an RFID reader having a reader antenna; a first antenna configured to be coupled with the reader antenna; a second antenna configured to be coupled with the transponder antenna; and a first coaxial cable which is coupled to the first and second antennas.

These and other features and advantages of the invention will be described in more detail below with reference to associated drawings.

BRIEF DESCRIPTION OF THE DRAWINGS

The invention may best be understood by reference to the following description taken in conjunction with the accompanying drawings, which illustrate specific embodiments of the present invention. In the drawings, similar reference numerals/symbols correspond to similar elements.

DESCRIPTION OF EXAMPLE EMBODIMENTS

Overview

Figure 1:
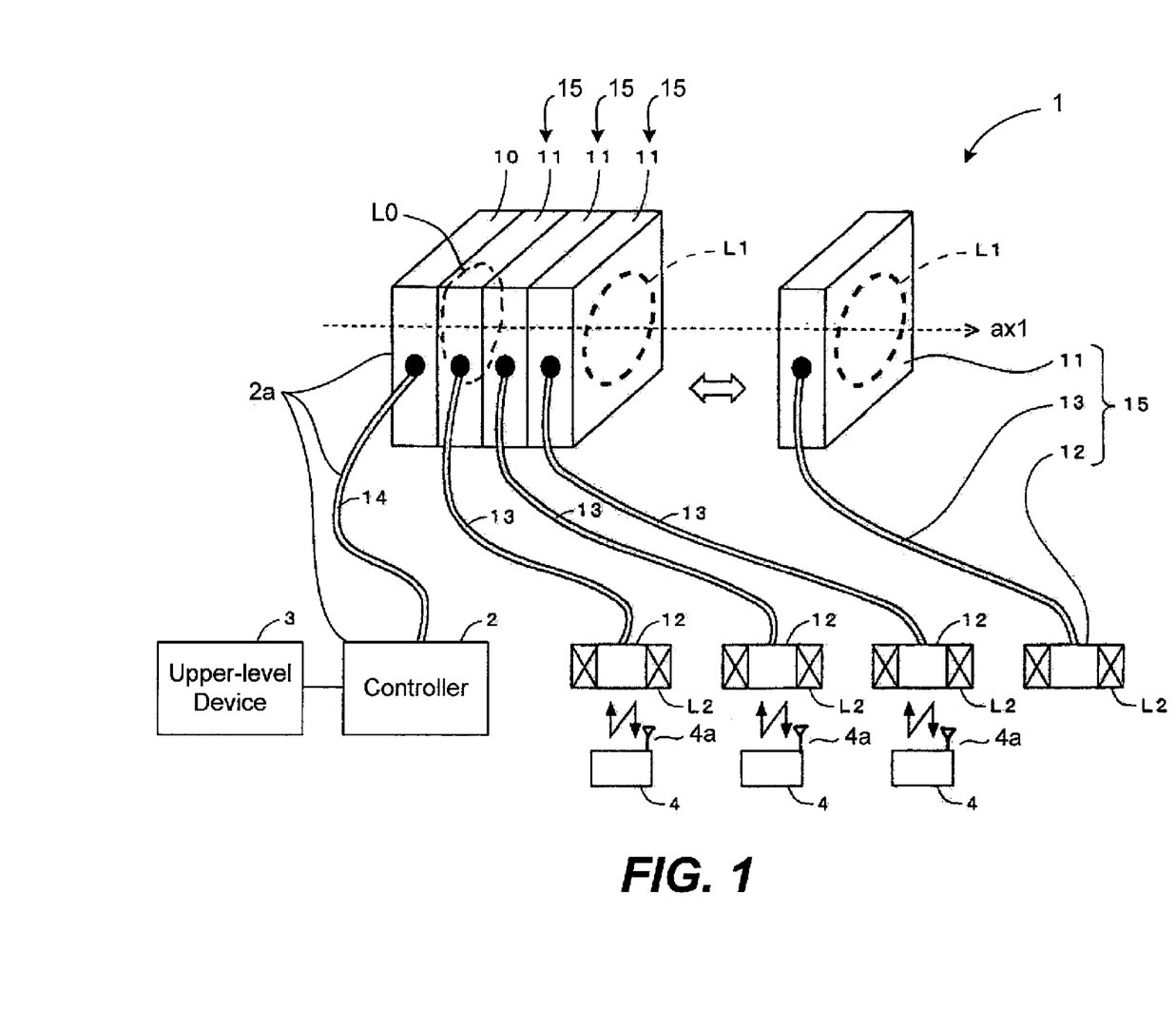
FIG. 1 illustrates a schematic diagram of an RFID system according to an example embodiment of the invention.

FIG. 1 illustrates a schematic diagram of an RFID system 1 according to an example embodiment of the invention. Referring to FIG. 1, the RFID system 1 includes an RFID reader 2a, RFID transponders (often referred to as RFID tags, or simply as tags) 4, and RFID repeaters 15. The RFID reader 2a includes a reader antenna 10, a coaxial cable 14, and a controller 2. The RFID reader 2a is typically coupled to an upper-level device 3 which uses information obtained remotely from the RFID transponders 4. The reader 2a and/or the device 3 may identify each of the RFID transponders based on stored information of the transponders. The reader 2a and/or the device 3 communicate with the transponders individually, or in a broadcasting manner. The communication may be either one-way (only from the transponders to the reader) or two-way (from the transponders to the reader, and vice versa). In the case of communication from the reader to the transponder, the "reader" may "write" data in a storage device in a transponder.

The controller 2 interfaces the device 3 to the reader antenna 10. The controller 2 receives data for interrogating the transponders 4 from the device 3, modulates the data for RFID (radio frequency identification), and drives the reader antenna 10 through the coaxial cable 14 by the modulated RF signal. The controller 2 also receives an RF signal from the reader antenna 10, demodulates the received RF signal to generate data for RFID, and outputs the demodulated data to the device 3. In some cases, a repeater according to an example embodiment of the invention may include an RFID reader shown as the RFID reader 2a in FIG. 1.

Typically, the RFID system 1 interrogates an RFID tag, and retrieves information on that RFID tag. Throughout the specification, RFID generally means communication between an RF reader and at least one RF transponder (an active transponder or a passive transponder) via an RF signal for any suitable purposes. In some cases, RFID does not necessarily involve any identification of a specific tag. In other words, RFID may only detect proximate existence of an RFID tag around the reader.

Each of the RFID transponders 4 includes a transponder antenna 4a. The RFID transponders 4 may be passive transponders having no batteries, or active transponders having batteries. Each transponder 4 includes an IC (integrated circuit) chip to store various information for RFID.

Each of the RFID repeaters 15 includes a reader-side antenna 11, a transponder-side antenna 12, and a coaxial cable 13 which couples the antennas 11 and 12. The reader-side antenna 11 is located relatively close to the reader antenna 10 so that the antennas 10 and 11 are coupled electromagnetically. The transponder-side antenna 12 is located relatively close to the transponder antenna 4a so that the antennas 12 and 4a are coupled electromagnetically.

Typically, antennas 10, 11, and 12 take the form of loop antennas (such as L1 or L2) which includes at least one turn of a conductive wire (usually referred to as a coil). Such a loop antenna may be molded by resin into a sealed package for mechanical and/or electrical stability. In the example embodiment, antennas 10 and 11 are loop antennas having substantially the same shape and size. Specifically, the diameter L0 of the antenna 10 is substantially the same as the diameter L1 of the antennas 11. The centers of the antennas 10 and 11 are substantially aligned on the same axis ax1. The antennas 10 and 11 typically contact with each other so that electromagnetic coupling with each other is sufficiently high for RF transmission between the antennas 10 and 11. Alternatively, the antennas 10 and 11 may have some space between two of them despite the fact that it may reduce the electromagnetic coupling with each other.

In order to stabilize the alignment of the antennas 10 and 11, each of the antennas 10 and 11 may have a protruding portion. By inserting protruding portions into a series of holes to be mated with such portions, the antennas 10 and 11 may be aligned along the axis ax1 with sufficient ease and precision. Alternatively, the antennas 10 and 11 may be mechanically coupled by connecting members. Still alternatively, each antenna may have a concave portion on one side, and a protruding portion on the opposite (or reverse) side where the concave and protruding portions are mated. In such a case, the antennas are mechanically couple by mating the concave and protruding portions.

Each of the transponder-side antennas 12 is located relatively close to the corresponding one of the transponder antennas 4a depending on the position of the transponder 4 to be coupled with the reader 2a. The shape and size of the transponder-side antennas 12 may be the same as, or similar to those of the antennas 10 and 11. Alternatively, the shape and size of the transponder-side antennas 12 may be different from those of the antennas 10 and 11 depending on the positions of the antennas 12 and/or the transponders 4.

System in Detail

Figure 2A:
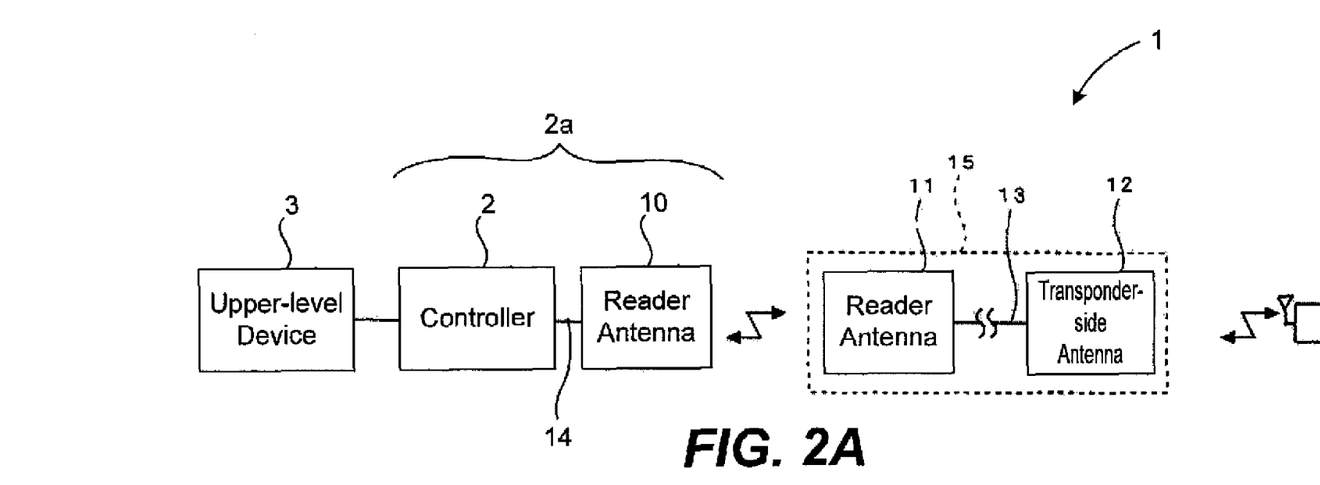
FIG. 2A illustrates another schematic diagram of the RFID system according to an example embodiment of the invention.

FIG. 2A illustrates another schematic diagram of the RFID system 1 according to an example embodiment of the invention. As shown in FIG. 2A, the reader antenna 10 is coupled to the controller 2 via the coaxial cable 14. The reader antenna 10 is positioned relatively close to the reader-side antenna 11 of the RFID repeater 15 so that the antennas 10 and 11 are electromagnetically coupled with each other. The transponder antenna 4a is positioned relatively close to the transponder-side antenna 12 of the RFID repeater 15 so that the antennas 4a and 12 are electromagnetically coupled with each other.

Figure 2B:
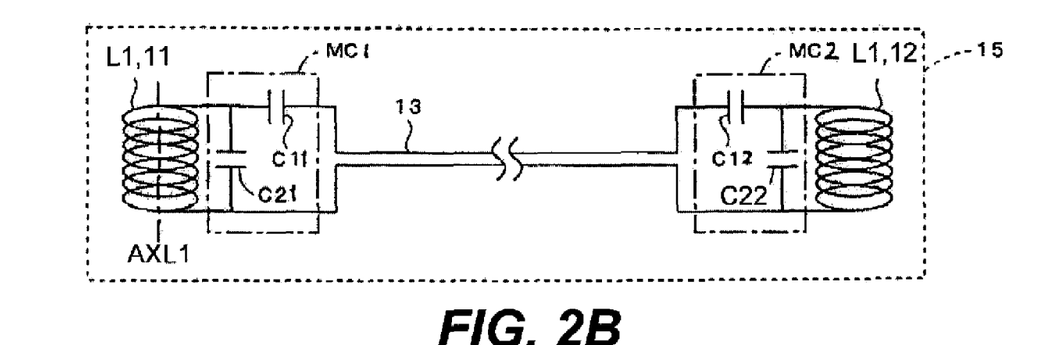
FIG. 2B illustrates a schematic diagram of the RFID repeater according to an example embodiment of the invention.

FIG. 2B illustrates a schematic diagram of the RFID repeater 15 according to an example embodiment of the invention. As shown in FIG. 2B, the repeater 15 includes a matching circuit MC1 which couples the antenna 11 (or the coil L1) to the coaxial cable 13. The repeater 15 also includes a matching circuit MC2 which couples the antenna 12 (or the coil L2) to the coaxial cable 13. According to an example embodiment of the invention, the repeater 15 includes only passive circuit elements such as inductive elements, capacitive elements, or resistive elements. In other words, the repeater 15 does not include active circuit elements such as transistors, diodes, or integrated circuits. In such a case, both of the matching circuits MC1 and MC2 are passive matching circuits which do not include any active circuit elements.

The matching circuit MC1 includes capacitors C11 and C21. According to an example embodiment of the invention, a characteristic impedance of the antenna 11 (i.e., an inductive element) and the matching circuit MC1 (i.e., a capacitive element) is substantially the same as that of the coaxial cable 13. The matching circuit MC2 includes capacitors C12 and C22. According to the example embodiment of the invention, a characteristic impedance of the antenna 12 (i.e., an inductive element) and the matching circuit MC2 (i.e., a capacitive element) is also substantially the same as that of the coaxial cable 13. Since (i) impedance matching between the cable 13; and the antenna 11 and the circuit MC1 is achieved; and (ii) impedance matching between the cable 13; and the antenna 12 and the circuit MC2 is achieved by the configuration above, an RF signal is transmitted through the repeater 15 with sufficiently low attenuation (e.g., with low reflection).

Further according to an example embodiment of the invention, the matching circuit MC1 includes only capacitors, and the matching circuit MC2 includes only capacitors. According to an example embodiment, either one of, or both of the matching circuit MC1 and MC2 may include resistive circuit elements (e.g., resistors) depending on various circuit requirements.

According to an example embodiment of the invention, in general, the repeater 15 does not have to include modulation/demodulation circuitry which adds costs and complexity. In order to relay an RF signal between the reader antenna 10 and the transponder antenna 4a, the repeater 15 have only to include at least a set of two antennas (e.g., coils L1 and L2) and a cable such as the coaxial cable 13. Such a simple configuration may be advantageous with respect to costs and implementation where multiple transponders 4 are located in a relatively wide area, as compared to a case in which each transponder 4 has the corresponding RFID reader.

Referring back to FIGS. 2A and 2B, the antenna 10 induces a magnetic field around the antenna 11, thereby generating an induced electric current in the coil L1 of the antenna 11. This induced current in the coil L1 is transmitted to the coil L2 of the antenna 12 through the matching circuits MC1 and MC2, and the coaxial cable 13. The transmitted current in the coil L2 then induces a magnetic field around the antenna 4a, thereby providing the transponder 4 with necessary RF energy for RFID.

In short, the RFID repeater 15 couples the RFID reader 2a to the RFID transponder 4. As a result, the transponders 4 do not have to be within direct proximity of the reader antenna 10. Rather, the transponders 4 have only to be located close enough to the transponder-side antennas 12 for communication with the reader 2a. The antennas 11 may be positioned to be aligned with each other so that axes AXL1 of the antennas 11 are substantially the same. However, in many cases, the antennas 11 may not be strictly aligned with each other as long as they are within the magnetic field generated by the reader antenna 10.

Figure 3:
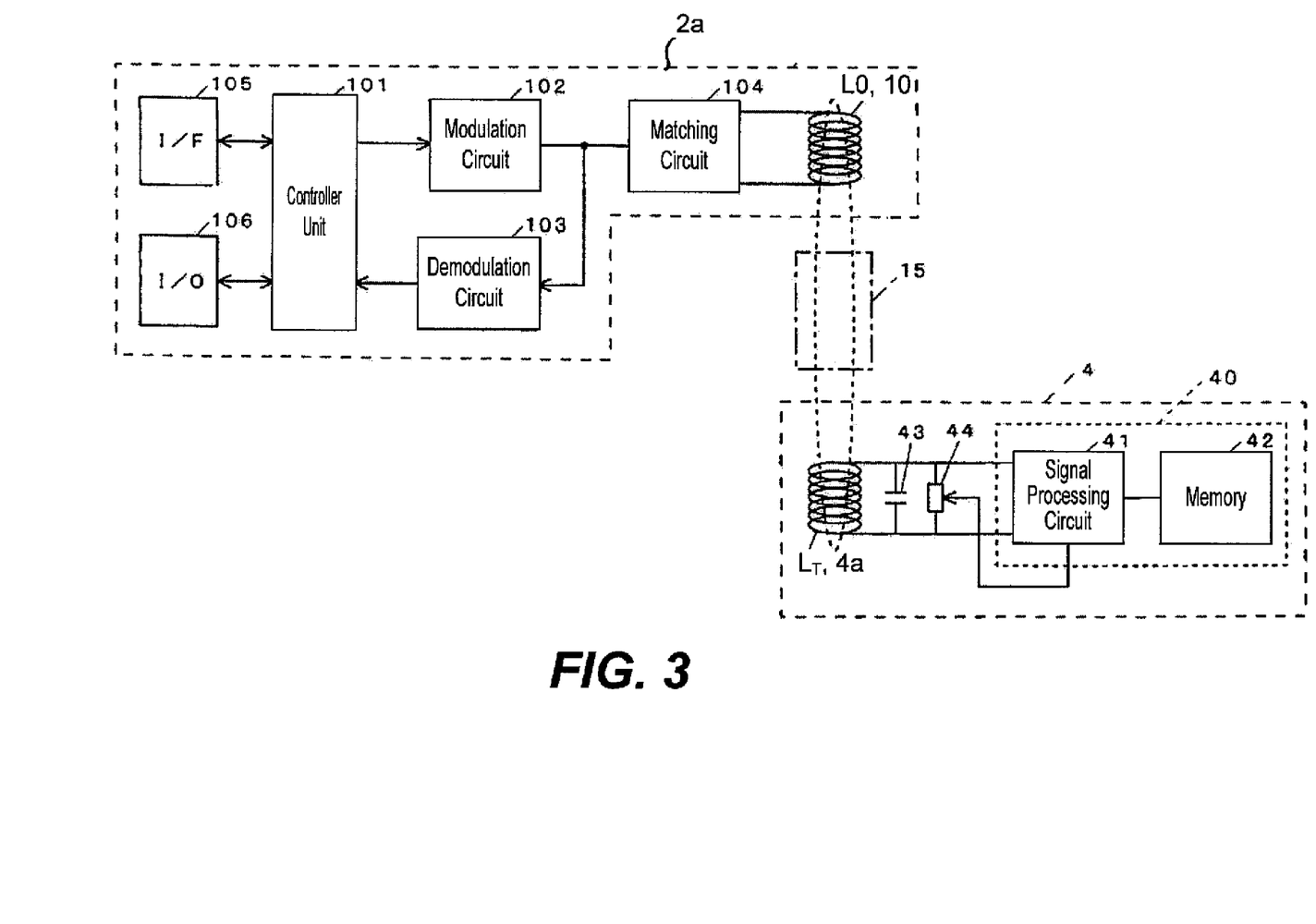
FIG. 3 illustrates a schematic diagram of the RFID reader, the repeater, and the RFID transponder according to an example embodiment of the invention.

FIG. 3 illustrates a schematic diagram of the RFID reader 2a, the repeater 15, and the RFID transponder 4 according to an example embodiment of the invention. The reader 2a includes the antenna 10 (e.g., the coil L0), a controller unit 101 using a microcomputer, a modulation circuit 102, a demodulation circuit 103, a matching circuit 104, an interface (I/F) circuit 105, and an input/output (I/O) circuit 106, etc. The modulation circuit 102 includes an oscillation circuit for generating a carrier wave, and a matching circuit. The demodulation circuit 103 includes a detector and a low-pass filter used for detecting a command signal of the transponder 4 from the carrier wave.

The transponder 4 includes an IC 40 which contains a signal processing circuit 41 and a semiconductor memory 42. Further, the transponder 4 includes the antenna 4a (e.g., the coil LT), a capacitor 43, and a load switch 44 (e.g., a variable resistor with a contact) for RF communication. The signal processing circuit 41 includes a microcomputer, circuitry for modulation/demodulation, and a converter for converting an alternate current induced in the coil to a direct current.

The repeater 15 is provided between the coil L0 of the reader antenna 10, and the coil LT of the transponder 4. The antenna 10 transmits a signal including a command signal on the carrier wave in the form of a radio wave. This radio wave is relayed by the repeater 15, and transmitted to the transponder 4, resulting in the induction of a necessary electric power in the transponder 4 which enables the transponder 4 to communicate with the reader 2a.

The signal processing circuit 41 in the transponder 4 demodulates the command signal from the signal received via the repeater 15. The circuit 41 then performs a process (e.g., retrieval of information from the memory 42, or storage of information in the memory 42) depending on the command. Once the process is performed, the transponder 4 forwards a response signal back to the reader 2a. This response signal is transmitted by switching the on/off states of the load switch 44, thereby varying the impedance of the transponder 4. The change in the impedance of the transponder 4 changes the impedance of the repeater 15, and the impedance of the antenna 10, resulting in changes in the currents flowing through the coils L2, L1 and L0. The demodulation circuit 103 of the reader 2a demodulates the command signal based on the current change induced in the antenna 10 (e.g., the coil L0).

Figure 4A:
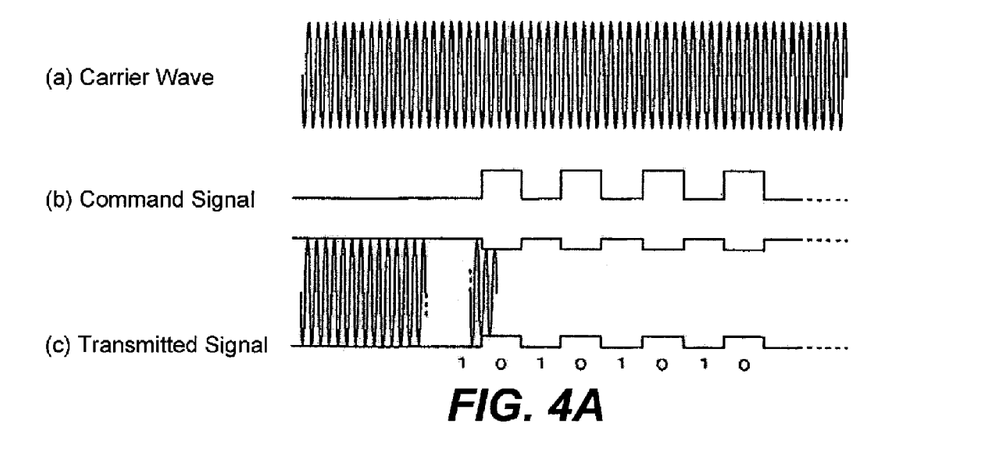
FIG. 4A illustrates a schematic diagram of a process for generating a signal transmitted from the antenna.

FIG. 4A illustrates a schematic diagram of a process for generating a signal transmitted from the antenna 10. Specifically, FIG. 4A shows (a) the carrier wave, (b) a command signal (a digital signal) to the transponder 4, and (c) a transmitted signal (e.g., an ASK (amplitude shift keying) modulation signal). The modulation circuit 103 modulates the carrier wave (a) by the command signal (b), thereby generating the transmitted signal (c).

Figure 4B:
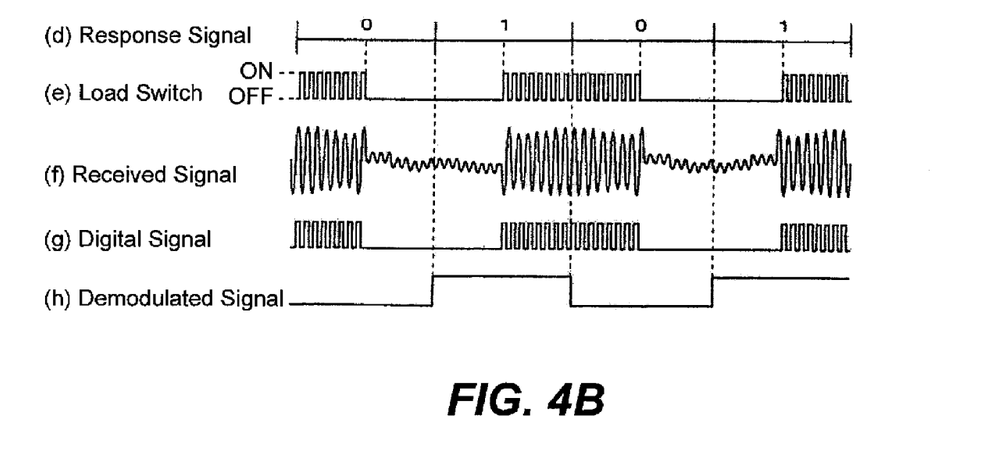
FIG. 4B illustrates a schematic diagram of a process for generating a response signal at the transponder, and a demodulation process for the response signal at the reader.

FIG. 4B illustrates a schematic diagram of a process for generating a response signal at the transponder 4, and a demodulation process for the response signal at the reader 2a. The signal processing circuit 41 of the transponder 4 identifies the contents of the command by demodulating the transmitted signal. The circuit 41 then performs a process depending on the command, and generates a response signal including multiple bits. In this process, as shown in (d) and (e) of FIG. 4B, a transmission period having a certain length is assigned to each bit constituting the response signal, and each bit is sequentially transmitted. Specifically, when transmitting a "0" signal, the on/off states of the load switch 44 are changed for multiple times during the first half of the time period, and are remained off during the last half of the time period. Conversely, when transmitting a "1" signal, the on/off states of the load switch 44 are remained off during the first half of the time period, and are changed for multiple times during the last half of the time period.

The switching operation of the load switch 44 causes the demodulation circuit 103 of the reader 2a to extract a signal shown in FIG. 4B (f). The demodulation circuit 103 then digitizes the signal based on a predetermined threshold, thereby generating a demodulated signal which reflects the switching operation of the load switch 44. This signal is then analyzed in terms of each transmission period to recognize a signal change pattern in each time period, thereby demodulating the response signal as shown in FIG. 4B (h).

In this example embodiment, each repeater 15 has been assigned a relationship with the corresponding transponder as shown in FIG. 2A. As such, the reader 2a is capable of communicating with any of the transponders 4 via the corresponding repeater 15 as shown in FIG. 4A (c) and FIG. 4B (f). Therefore, the reader 2a can communicate with any of the transponders 4 in the same manner as the case where each transponder 4 is located within the communication area of the reader antenna 10.

The controller 2 can avoid communication collision since the controller 2 assigns a specific processing time slot for each transponder 4 based on instructions from the device 3, and processes the communication by the antenna 10, as appreciated by those skilled in the art. Thus, each transponder 4 can properly process a command transmitted thereto. Similarly, the controller 2 and the device 3 do not cause confusion in understanding the response signals from various transponders 4.

Configuration of Antennas

In general, the intensity of the magnetic field decreases as the distance between the transmitting/receiving antennas increases. As shown in FIG. 1, the distance between the reader antenna 10 and each reader-side antenna 11 of the repeater 15 may change the degree of the corresponding electromagnetic coupling between the antenna 10 and each antenna 11. Example embodiments discussed below referring to FIGS. 5-8 may be advantageous primarily in compensating such variations in the intensity of the magnetic field (or, the degree of the electromagnetic coupling) between the antennas.

Figure 5:
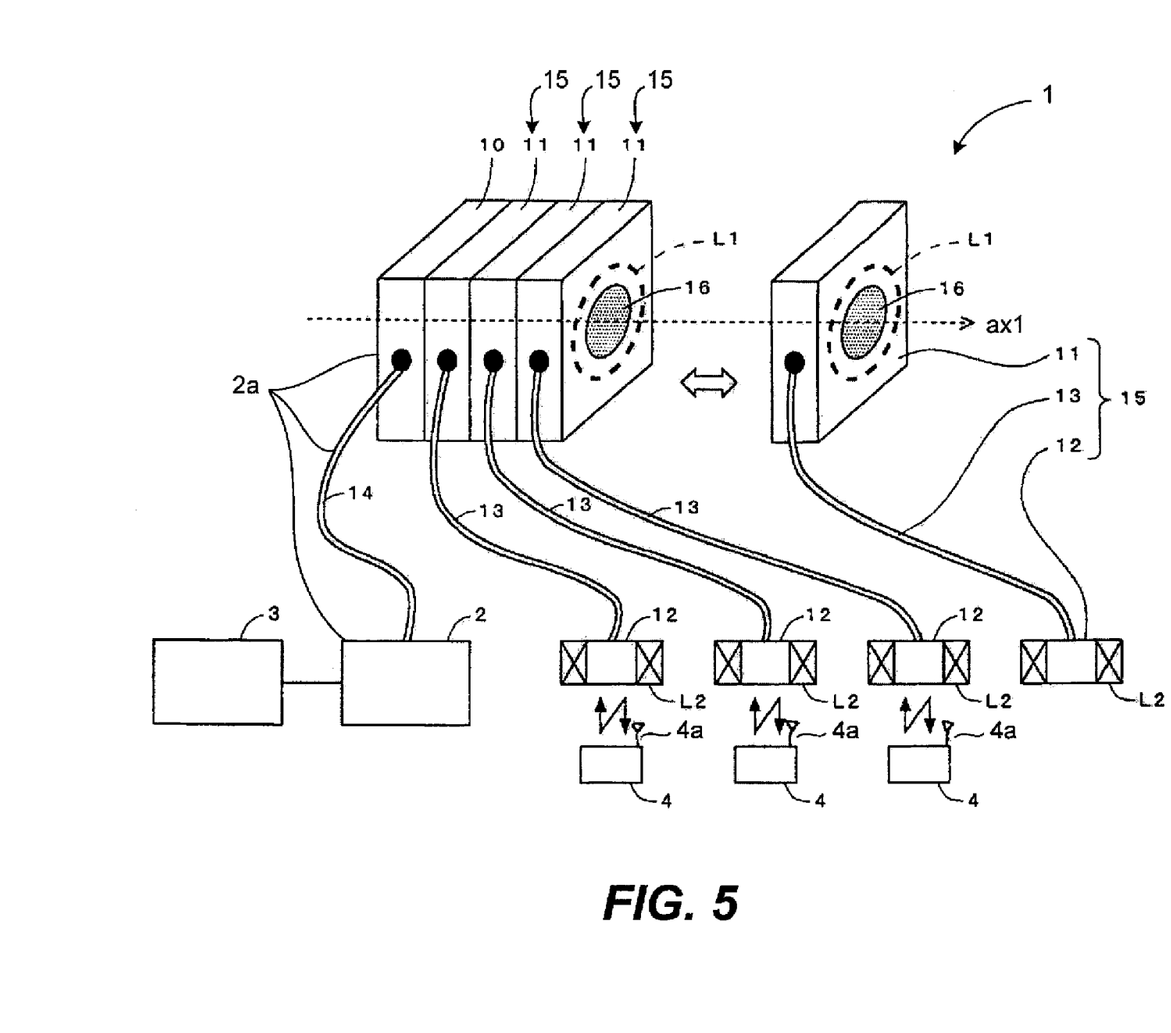
FIGS. 5 and 6 illustrate a schematic diagram of another example of the system according to an example embodiment of the invention.
Figure 6:
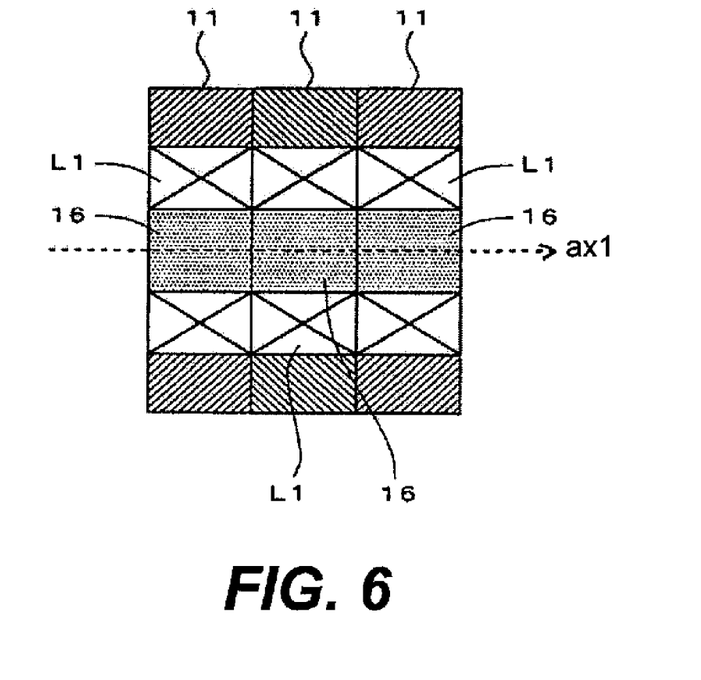

FIGS. 5 and 6 illustrate a schematic diagram of another example of the system 1 according to an example embodiment of the invention. In these example embodiments, the coil element (e.g., L0) of the reader antenna 10, and each coil element L1 of the reader-side antenna 11 are coupled at least partially via a magnetic core 16. Specifically, each of the coils L1 has a magnetic core 16 therewithin, which is aligned along the axis ax1, as shown in FIGS. 5 and 6.

Such a core 16 may be a ferrite core which can be embedded within a antenna housing when molding the antenna 11. The magnetic core 16 may have the same thickness along the axis ax1 as that of the antenna 11. In FIG. 6, conductive wires for the coil L1 do not have to fill the entire cross-section of L1 since the coil L1 includes any suitable number of the turns of wires. The cores 16 have the same position relative to the axis ax1, and the same diameters with each other, thereby magnetically coupling the cores 16 strongly as if the cores constitute a single rod. The antenna 10 may include a similar magnetic core as the core 16 to achieve the similar effects or advantages.

The configuration shown above concentrates the magnetic fluxes generated by the antenna 10 toward the cores 16, thereby averaging the intensity of the magnetic field. Thus, such a configuration may be advantageous when stabilized coupling between the antennas 10 and 11 (or stabilized relay of the RF signal across the antennas 10 and 11) is needed. The antennas 11 located distant from the antenna 10 may utilize the necessary intensity of the magnetic field for stabilized RF signal relaying.

Figure 7:
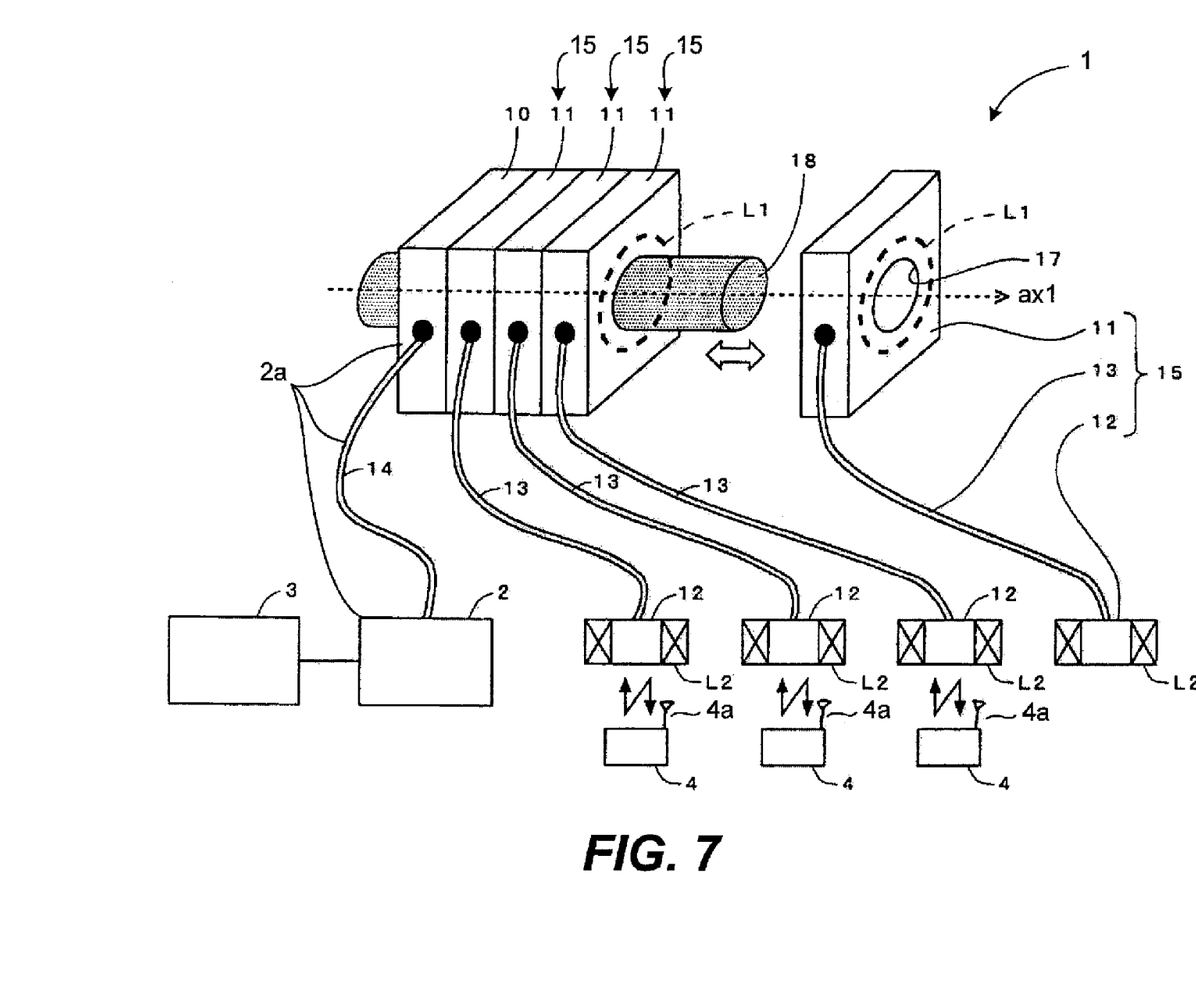
FIG. 7 illustrates a schematic diagram of another example of the system according to an example embodiment of the invention.

FIG. 7 illustrates a schematic diagram of another example of the system 1 according to an example embodiment of the invention. The example embodiment of FIG. 7 also provides a magnetic core (e.g., a ferrite core) to average the magnetic fluxes. In the example embodiment, the antenna 10 and the antennas 11 are coupled via a magnetic core (e.g., a ferrite rod 18) which is inserted through the antenna 10 and the antennas 11. In order to insert such a core into the antennas 10 and 11, these antennas have holes 17 within their coils. The diameter of the holes 17 are large enough to accept the ferrite rod 18. The antennas 10 and 11 are electromagnetically coupled via the ferrite rod 18. As such, the above-discussed connecting members, and concave/protruding portions for mechanical linkage are not necessary in this example embodiment.

Figure 8:
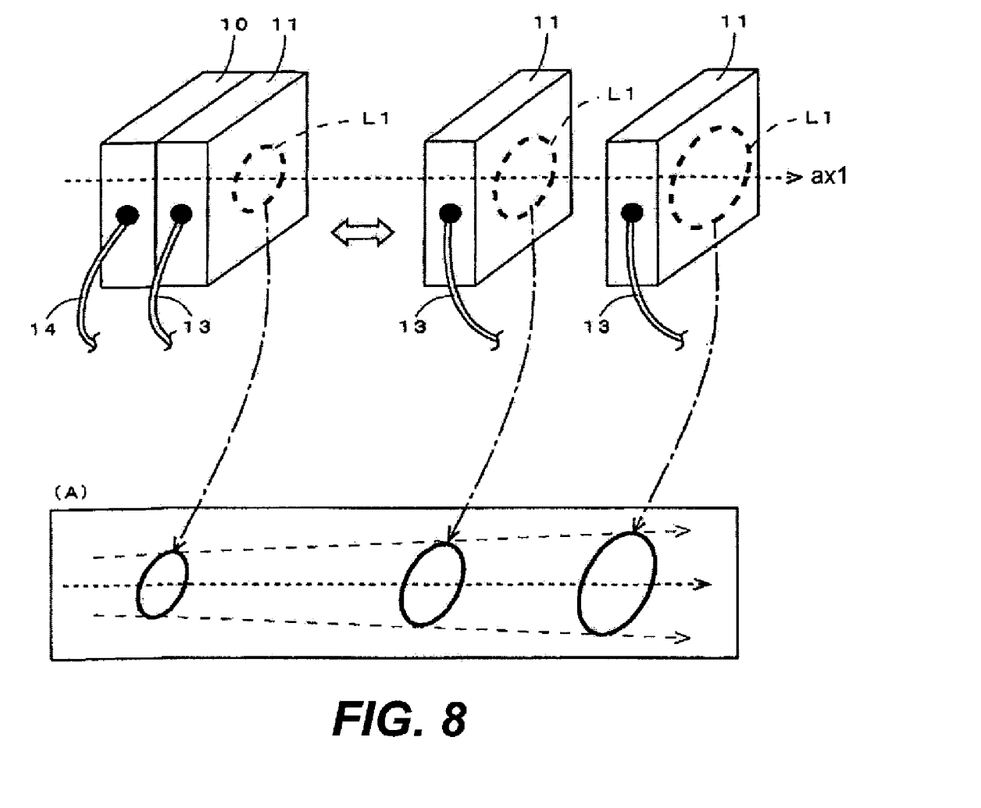
FIG. 8 illustrates a schematic diagram of still another example of the system according to an example embodiment of the invention.

FIG. 8 illustrates a schematic diagram of still another example of the system 1 according to an example embodiment of the invention. According to the example embodiment of FIG. 8, the cross-section of the coil L1 is changed depending on its distance from the antenna 10. Specifically, as shown in area (A) of FIG. 8, the diameter of the coil L1 increases as the distance from the antenna 10 increases. The centers of the coils L1 may be aligned along the axis ax1.

Since the diameter of the coil L1 of the antenna 11 increases as the distance from the antenna 10 increases, the inductance of the coil L1 also increases. Consequently, a Q value of the coil L1 increases when the distance of the coil L1 from the antenna 10 increases, thereby causing a higher peak of resonance, and increasing the reception strength. Thus, even though the magnetic field generated in the coil L1 decreases, the RF communication is relayed through the repeaters 15 with sufficient quality.

Instead of changing the diameter of the coil L1 depending on the distance from the antenna 10, resistance of a resistor connected to the coil L1 may be adjusted. Specifically, by reducing the resistance of the resistor as the distance from the antenna 10 increases, the Q value of the coil L1 increases, thereby compensating the attenuation of the magnetic fluxes depending on the location of the coil L1, similar to the example embodiment of FIG. 8.

Alternatively, a number of the turns of the coil L1 may be adjusted to compensate the attenuation of the magnetic fluxes depending on the location of the coil L1. Specifically, the number of the turns of the coil L1 increases as the distance from the antenna 10 increases.

In the example embodiments discussed above, the antennas 10 and 11 have the same shape and size, and the antennas are aligned with respect to the axis ax1 so that the centers of the antennas 10 and 11 are on the axis ax1. However, the configuration of the antennas 10 and 11 is not limited to those example embodiments as discussed below.

Figure 9:
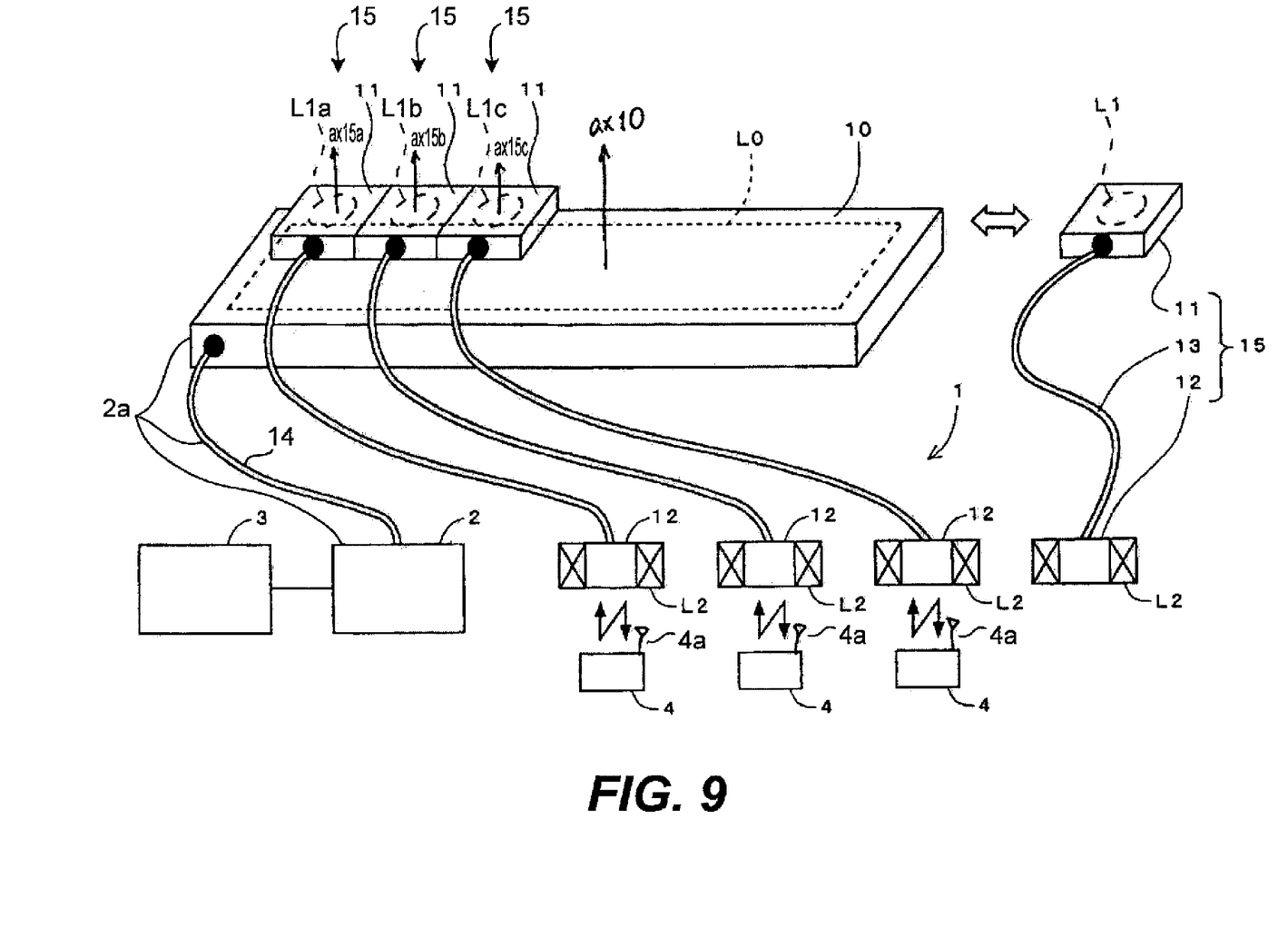
FIGS. 9 and 10 illustrate schematic diagrams of still another examples of the system according to example embodiments of the invention.
Figure 10:
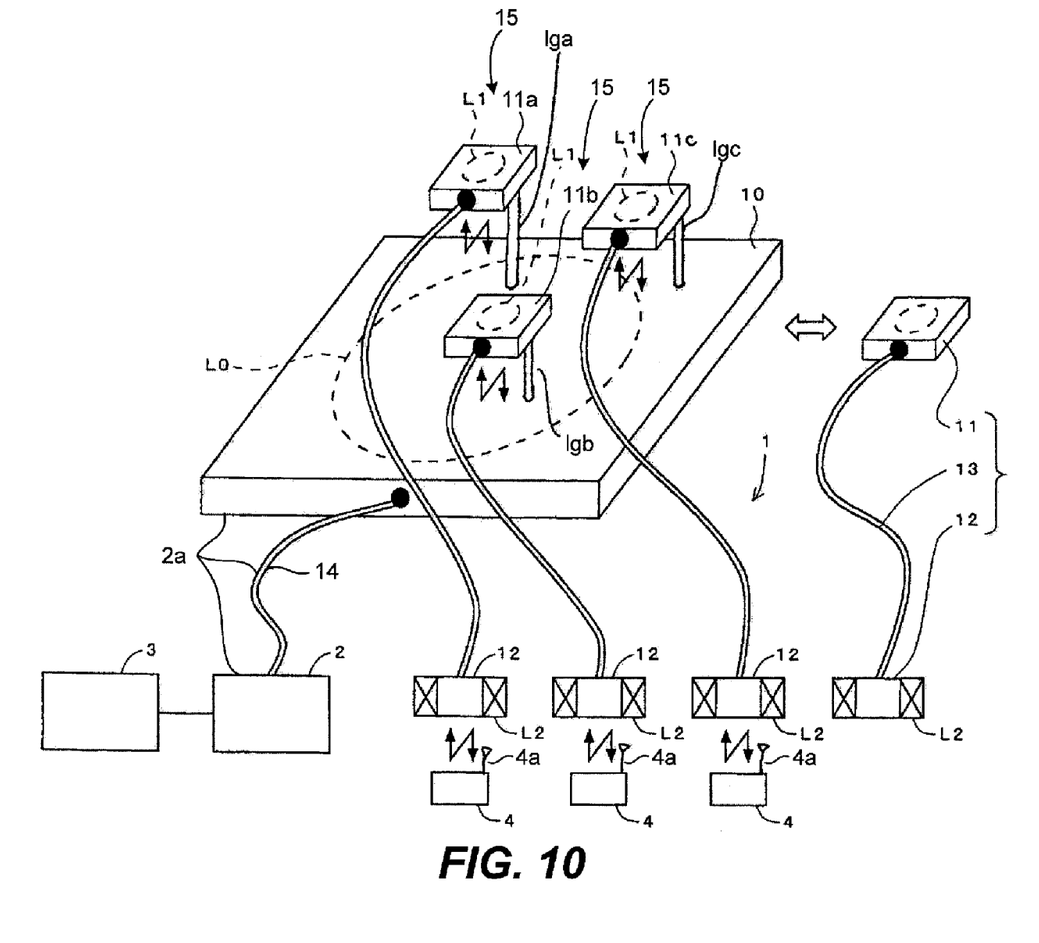

FIGS. 9 and 10 illustrate schematic diagrams of still another examples of the system 1 according to example embodiments of the invention. According to the example embodiments of FIGS. 9 and 10, the antenna 10 is larger than the antennas 11. Each of the antennas 11 is located within the area where the magnetic fluxes generated by the antenna 10 can be used for the RF communication.

In FIG. 9, an axis ax15a of the coil L1a of the repeater 15a, and an axis ax15b of the coil L1b of the repeater 15b are substantially parallel to an axis ax10 of the coil L0 of the reader antenna 10. Additionally, an axis ax15c of the coil L1c of the repeater 15c may be substantially parallel to the axis ax10 of the coil L0 of the reader antenna 10. The coil L1a of the repeater 15a, and the coil L1b of the repeater 15b are provided substantially within the coil L0 of the reader antenna 10, and do not overlap with each other. Additionally, the coil L1c of the repeater 15c is also provided substantially within the coil L0 of the reader antenna 10, and does not overlap with the coils L1a and L1b. Here the axes ax10, ax15a, ax15b, and ax15c are defined as normal directions of the plains corresponding to the antennas 10, 15a, 15b, and 15c, respectively. The antennas 11 may be mechanically coupled with the antenna 10 by using the above-discussed concave/protruding portions.

The antennas 11 may be located on a single plain which is substantially parallel to a plain which includes the antenna 10. In order to achieve such a configuration, the bottom surfaces of the antennas 11 are flush with the top surface of the antenna 10.

By contrast, in FIG. 10, the antennas 11 are located above the plain including the antenna 10. In order to achieve the configuration of FIG. 10, legs lga, lgb, and lgc made of resin may be provided to position the antennas 11a, 11b, and 11c, respectively. The legs lga, lgb, and lgc may have different lengths depending on required linkage degrees between the antenna 10 and the antennas 11a, 11b, and 11c. As long as the antennas 11a, 11b, and 11c are positioned close enough to the antenna 10, the RF communication between the reader 2a and the transponders 4 is effectively achieved.

In the example embodiments discussed above, each transponder-side antenna 12 corresponds to a single transponder 4. However, each transponder-side antenna 12 may correspond to multiple transponders 4. In such a case, those multiple transponders 4 can be handled by the single antenna 12 which corresponds thereto. As appreciated from the discussion here, the transponder 4 may be covered directly by the antenna 10 rather than one of the antennas 12 of the repeaters 15. Also, in any of the example embodiments discussed above, the antenna 10 itself may incorporate functionality of the controller 2 (with or without the cable 14) so that the antenna 10 can be directly connected to the device 3.

CONCLUSION

Although the foregoing invention has been described in some detail for purposes of clarity of understanding, it will be apparent that certain changes and modifications may be practiced without departing from the spirit and scope of the invention as defined in the claims. Further, features of the invention described herein may be provided alone or in any combination.

What is claimed is:

1. A repeater for relaying an RF signal between an RFID (radio frequency identification) transponder having a transponder antenna, and an RFID reader having a reader antenna, comprising:

a first antenna pair consisting of a first antenna configured to be coupled with the reader antenna and a second antenna configured to be coupled with the transponder antenna;

a first coaxial cable which is coupled to the first and second antennas a second antenna pair consisting of another first antenna configured to be coupled with the reader antenna and another second antenna configured to be coupled with another transponder antenna included in another RFID transponder; and a second coaxial cable which is coupled to the antennas of the second antenna pair, wherein the reader antenna has a coil element, the first antennas each have a coil element, and the coil elements of the first antennas each have an axis that is substantially the same as an axis of the coil element of the reader antenna.

2. The repeater of claim 1, wherein the coil element of the reader antenna, the coil element of the first antenna of the first antenna pair, and the coil element of the first antenna of the second antenna pair are coupled at least partially via a magnetic core.

3. The repeater of claim 2, wherein each of the coil elements of the first antennas of the first antenna pair and the second antenna pair has a magnetic core.

4. The repeater of claim 2, wherein the coil element of the reader antenna, the coil element of the first antenna of the first antenna pair, and the coil element of the first antenna of the second antenna pair are coupled via a magnetic core which is inserted through the coil element of the reader antenna, the coil element of the first antenna of the first antenna pair, and the coil element of the first antenna of the second antenna pair.

5. The repeater of claim 1, wherein a Q value of the coil element of the first antenna of the second antenna pair is larger than a Q value of the coil element of the first antenna of the first antenna pair when a distance between the first antenna of the second antenna pair and the reader antenna is larger than a distance between the first antenna of the first antenna pair and the reader antenna.

6. The repeater of claim 1, wherein a cross-section of the coil element of the first antenna of the second antenna pair is larger than a cross-section of the coil element of the first antenna of the first antenna pair when a distance between the first antenna of the second antenna pair and the reader antenna is larger than a distance between the first antenna of the first antenna pair and the reader antenna.

7. The repeater of claim 1, wherein a number of turns of the coil element of the first antenna of the second antenna pair is larger than a number of turns of the coil element of the first antenna of the first antenna pair when a distance between the first antenna of the second antenna pair and the reader antenna is larger than a distance between the first antenna of the first antenna pair and the reader antenna.

8. The repeater of claim 1, wherein an axis of the coil element of the first antenna of the first antenna pair, and an axis of the coil element of the first antenna of the second antenna pair are substantially parallel to an axis of the coil element of the reader antenna, the coil element of the first antenna of the first antenna pair, and the coil element of the first antenna of the second antenna pair are provided substantially within the coil element of the reader antenna, and do not overlap with each other.

9. The repeater of claim 1, further comprising:

a first passive matching circuit configured to couple the first antenna of the first antenna pair to the first coaxial cable; and a second passive matching circuit configured to couple the second antenna of the first antenna pair to the first coaxial cable, wherein the repeater does not include active circuit elements.

10. The repeater of claim 9, wherein the first passive matching circuit consists of one or more capacitors, and the second passive matching circuit consists of one or more capacitors.

11. The repeater of claim 9, wherein a characteristic impedance of the first antenna of the first antenna pair and the first passive matching circuit is substantially the same as that of the first coaxial cable, and a characteristic impedance of the second antenna of the first antenna pair and the second passive matching circuit is substantially the same as that of the first coaxial cable.

* * * * *